US008175903B2

(12) United States Patent
Brierley et al.

(10) Patent No.: US 8,175,903 B2
(45) Date of Patent: May 8, 2012

(54) METHOD AND SYSTEM FOR SCREENING AND EVALUATION OF RESEARCH PANEL MEMBERS

(75) Inventors: Harold Milton Brierley, Dallas, TX (US); Stephen Allen Myers, Dallas, TX (US); Sean Warren Eidson, University Park, TX (US); James Sterling Harter, Lantana, TX (US); James F. Morse, Dallas, TX (US); David Samuel Sink, Plano, TX (US); Eric Steven Herfield, Plano, TX (US); Richard Craig Stevens, Allen, TX (US)

(73) Assignee: e-Rewards, Inc., Plano, TX (US)

( * ) Notice: Subject to any disclaimer, the term of this patent is extended or adjusted under 35 U.S.C. 154(b) by 137 days.

(21) Appl. No.: 12/573,348

(22) Filed: Oct. 5, 2009

(65) Prior Publication Data
US 2010/0114666 A1 May 6, 2010

Related U.S. Application Data

(60) Provisional application No. 61/111,586, filed on Nov. 5, 2008.

(51) Int. Cl.
*G06Q 10/00* (2012.01)
(52) U.S. Cl. ...................... 705/7.11; 705/7.38
(58) Field of Classification Search ............... 705/7.11, 705/7.38
See application file for complete search history.

(56) References Cited

U.S. PATENT DOCUMENTS

| 6,311,190 | B1 | 10/2001 | Bayer et al. | |
|---|---|---|---|---|
| 2002/0161779 | A1* | 10/2002 | Brierley et al. | 707/103 R |
| 2006/0075492 | A1 | 4/2006 | Golan et al. | |
| 2008/0183519 | A1* | 7/2008 | King et al. | 705/7 |
| 2009/0222551 | A1* | 9/2009 | Neely et al. | 709/224 |
| 2009/0292587 | A1* | 11/2009 | Fitzgerald | 705/10 |

OTHER PUBLICATIONS

Kaplan et al., "Intentions to report questionable acts: An examination of the influence of anonymous reporting channel, internal audit quality, and setting", Journal of Business Ethics, (2007); 71: 109-124.*

* cited by examiner

*Primary Examiner* — Thomas Mansfield
(74) *Attorney, Agent, or Firm* — Fulbright & Jaworski L.L.P.

(57) ABSTRACT

System and method for optimizing composition of a pool from which members are selected to serve on market research panels are described. In one embodiment, the system includes a database comprising a plurality of member profiles and survey data associated with the members and a datamart for periodically scanning the database to discover events and subsequently logging each of the discovered events in an event log. The system further includes an offense module for periodically evaluating the event log to determine whether one of the discovered events comprises an offense committed by one of the members and logging the offense in an offense log and an audit module for performing an audit of the one of the members and logging results of the audit in an audit log.

32 Claims, 8 Drawing Sheets

Create Audit Test

Home >> Manage Audit Definitions >> Create Audit Test

▲ Logout

Name [My new audit Test] —200

202—○ Results are numeric values

204—◉ Results are discrete values

[Who Knows] —206

[Add] —208

Great Guy
Complete Idiot
Who Knows
—210

212— [Save] [Cancel]

*Fig. 2*

Home > Manage Trigger Rules > Edit Trigger Rules

Edit Trigger Rules

Enter a description for this rule, select an associated audit, and select a desired frequency. You must validate your rule prior to testing or saving.

Description: testing another audit — 400

Comments: — 402

Action: 2 - testing another audit — 404

Frequency: Daily — 406

Rule:
```
select msa.member_id
from veracity_adm.ver_mbr_attribute ma,
    (select member_id,
max (msa.CENRESPONSEDETAIL_ID) id from
veracity_adm.ver_mbr_survey_answer msa where
msa.mattribute_id = 16 and msa.current_answer_flag
= 'Y' group by member_id) msb,
    ver_mbr_survey_answer msa
where ma.mattribute_id = 16 and msb.id =
msa.cenresponsedetail_id
and ma.member_id = msa.member_id AND
msa.MATTRIBUTE_VALUE_ID <> ma.mattribute_value_id
```
— 408

[Validate] — 410   [Test] — 412   [Save] — 414

*Fig. 4*

Home > Manage Members and Audits > Review Expulsion Recommendations       ▲ Logout

Review Expulsion Recommendations

Using the checkboxes, select the members you wish to take action on. You may expel them or return them to the panel for normal operations. You may click on an individual member to review the details of that member.

- ☐ SMITH, S (69266)
- ☐ BROWN, G (55808)
- ☐ GREEN, G (63838)
- ☐ WILSON, D (65195)
- ☐ WHITE, R (06166)
- ☐ SMITH, J (41725)
- ☐ BROWN, E (63592)
- ☐ GREEN, R (95692)
- ☐ WILSON, K (16961)
- ☐ WHITE, J (56032)
- ☐ SMITH, E (66428)

Review Audits In Progress

Specify filters you would like to use for examining the current in progress audits.
Only Audit, Audit Test or Trigger search can be used at a time.

Audit [ 2 - testing another audit ⌄ ]   Audit Test [ All ⌄ ]   Trigger [ All ⌄ ]   Date [       ]   [ Retrieve ]

Click on the name of a member to view the details of that member. Click on the name of the audit to view current and pending results of the tests for that member in the audit.

| Name | Member ID | Audit | Audit Test Progress |
|---|---|---|---|
| SMITH, P | 99146 | testing another audit | 0/1 |
| BROWN, S | 99255 | testing another audit | 0/1 |
| GREEN, K | 51374 | testing another audit | 0/1 |
| WILSON, A | 10434 | testing another audit | 0/1 |
| WHITE, A | 10532 | testing another audit | 0/1 |
| SMITH, J | 28644 | testing another audit | 0/1 |
| BROWN, J | 10734 | testing another audit | 0/1 |
| GREEN, T | 90877 | testing another audit | 0/1 |
| WILSON, C | 10933 | testing another audit | 0/1 |
| WHITE, A | 81196 | testing another audit | 0/1 |
| SMITH, C | 93282 | testing another audit | 0/1 |
| BROWN, E | 91395 | testing another audit | 0/1 |
| GREEN, A | 10434 | testing another audit | 0/1 |
| WILSON, K | 48534 | testing another audit | 0/1 |

*Fig. 7*

Review Audits Awaiting Adjudication

Specify filters you would like to use for examining the audits awaiting adjudication. Only Audit, Audit Test or Trigger search can be used at a time.

Audit [All ▽]  Audit Test [All ▽]  Trigger [All ▽]  Date [____] [Retrieve]
       800            802                804                806

Select members you wish to take action on by clicking on the checkboxes. Select the action to take in the drop down list and click on Execute. You may also view a member's details by clicking on the member's name. You may view the Audit Test results by clicking on the name of the audit next to the member in question.

Member                    Audit
☐ SMITH, L (70811)        testing VCM Access  ⎫
☐ BROWN, J A (29293)      testing another audit ⎬ 808
☐ GREEN, L (85513)        testing another audit ⎭

Action [Expel ▽]   [Execute]
        810          812

Fig. 8

METHOD AND SYSTEM FOR SCREENING AND EVALUATION OF RESEARCH PANEL MEMBERS

CROSS-REFERENCE TO RELATED APPLICATIONS

This application claims the benefit under Title 35, United States Code §119(e) of United States Provisional Patent Application No. 61/111,586, filed on Nov. 5, 2008, the disclosure of which is incorporated herein by reference in its entirety.

BACKGROUND

The present invention relates generally to online marketing research and, more particularly, to a system and method for screening and ongoing evaluation of members of research panels for conducting such marketing research. With the advent of the Internet, traditional marketing research has been rapidly transformed. In particular, given the immense potential of merging the power of the Internet with proven market research practices, market research companies have been striving to distinguish themselves in the marketplace. One means by which this has been accomplished is through optimization of the composition of the research panel utilized to conduct a particular research study.

Many market research companies maintain a pool of potential panelists, or "members," each of whom may have been invited to join the pool based on certain selection criteria. Each member completes an enrollment questionnaire the information from which the company uses to compile and maintain a profile for each member. The information contained in the profile, either alone or in combination with a screening questionnaire, or "screener", enables the company to select members to serve as panelists for a particular market research study. For example, for a market research study involving marketing of a product targeted to women between the ages of 35 and 55, the company would be best served by selecting panelists whose profiles indicate that they are members of the targeted gender and age groups.

In view of the fact that participating in such studies is time consuming, in order to persuade qualified persons to participate in the studies, incentives are offered, often in the form of reward points. Typically, a member earns and accumulates such reward points based on the number of surveys he or she completes, and the length of time required to complete the survey. Reward points may be redeemable for a variety of goods and services. It will be recognized that there will be members whose sole purpose for participating in a research study is to acquire reward points; indeed, there will be members who manipulate the system to maximize their accumulation of such points, often at the expense of the validity of the information gleaned from the member. Additionally, because not every member is eligible to take every survey presented to them, members may compromise the validity of their responses from one interaction to another in order to maximize their opportunity to participate in a specific study.

SUMMARY

One embodiment is a system for optimizing composition of a pool from which members are selected to serve on market research panels. The system includes a database comprising a plurality of member profiles and survey data associated with the members and a datamart for periodically scanning the database to discover events and subsequently logging each of the discovered events in an event log. The system further includes an offense module for periodically evaluating the event log to determine whether one of the discovered events comprises an offense committed by one of the members and logging the offense in an offense log and an audit module for performing an audit of the one of the members and logging results of the audit in an audit log.

BRIEF DESCRIPTION OF THE DRAWINGS

FIGS. 2-8 illustrate graphical user interface screen displays for enabling a user to interact with the system of FIG. 1 in accordance with one embodiment.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

A primary objective of the embodiments described herein is to optimize the composition of a pool of members from which market research panelists, especially online market research panelists, are selected. In one aspect, optimization is facilitated through detection and quarantine or permanent expulsion of a member who exhibits one or more "negative behaviors," as will be described below. In one embodiment, a system enables automated detection of negative behavior patterns of a member and provides an audit and judgment framework in which a "quality team" constructs a more informed, holistic view of a member suspected of negative behavior prior to deciding whether or not the member should be permanently expelled from the pool. The data gathered on audited members, along with judgments related to same, are analyzed to facilitate a system that is continuously learning. Additionally, members who are undergoing an audit are temporarily expelled from the pool and are thereby prevented from serving as panelists during the audit period. Members who have been permanently expelled from the pool are prevented from receiving subsequent invitations to become members and participating in market research surveys.

Figure 1:
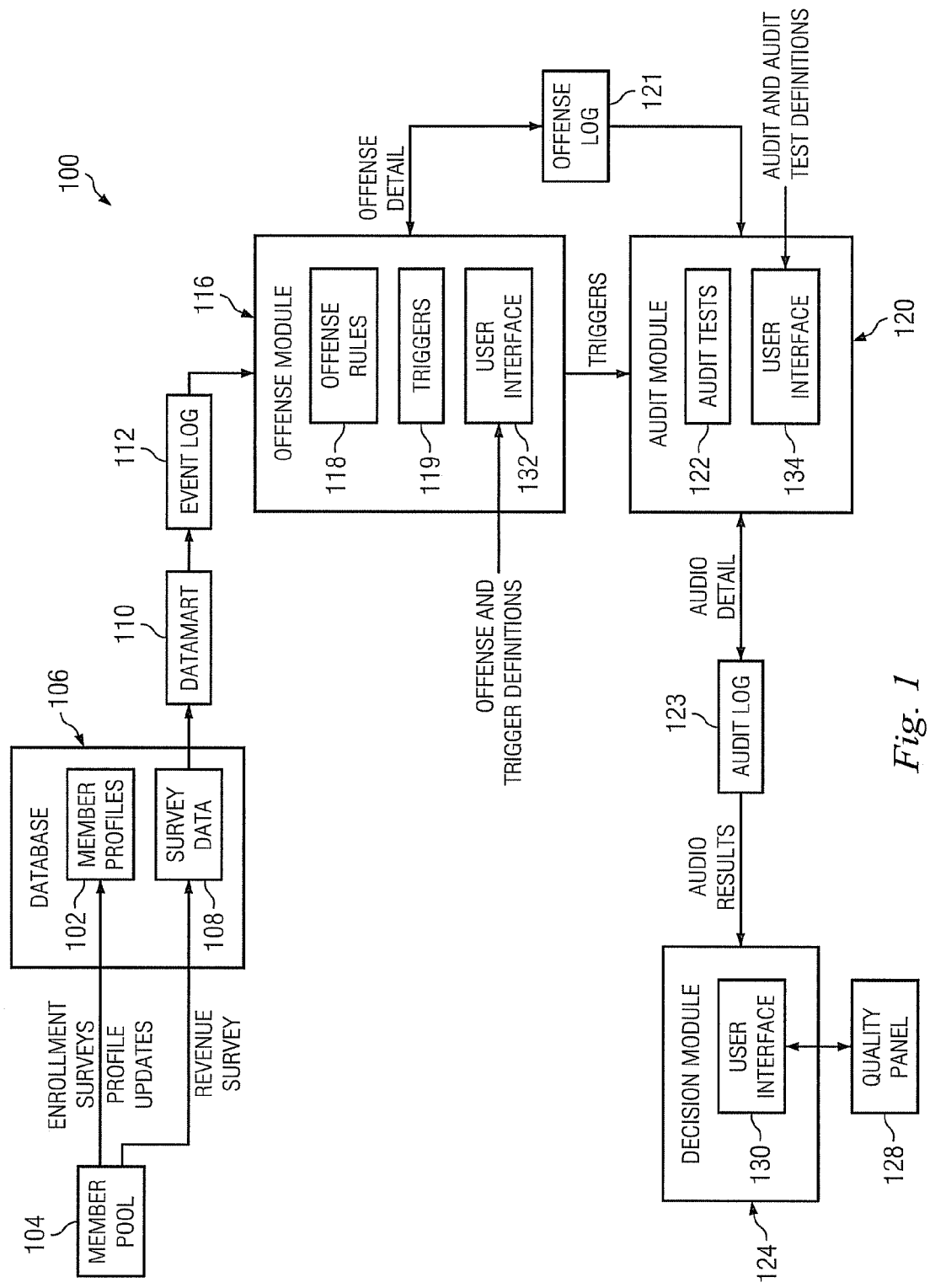
FIG. 1 is a block diagram of a system for optimizing the composition of panels used to conduct marketing research in accordance with one embodiment.

FIG. 1 is a block diagram of a system 100 for optimizing the composition of panels used to conduct marketing research in accordance with one embodiment. As illustrated in FIG. 1, member profiles 102 for a pool of members 104 from which panelists are selected are stored in a database 106. It will be recognized that there is a single member profile for each of the members in the pool. As previously noted, the member profiles are compiled from information provided by potential members in response to an enrollment survey. Additionally, subsequent to enrollment, members may update their profiles via profile updates. As also previously noted, once a determination is made to conduct a particular market research study, panelists are selected from the pool of members 104 in a conventional fashion based on appropriate selection criteria (e.g., gender, age, geographic location, profession). As part of the market research study, each panelist selected to participate completes a survey comprising a set of questions designed to elicit the panelist's opinion on various topics relevant to the study. All of the data comprising results of all of the surveys taken by the panelists is stored in the database 106 and designated by a reference numeral 108.

In the embodiment illustrated in FIG. 1, a separate datamart 110 is provided that periodically (e.g., each evening) scans the database 106 and creates an event log 112 comprised of events logged on a per-member basis, as will be described in greater detail below. Each entry in the event log indicates the member associated with the event, as well as various event details. It will be recognized that the functionality of the database 106 and the datamart 110 can be combined into a single module or onto a single platform. In accordance with one embodiment, an offense module 116 periodically (e.g., once per day) evaluates the data stored in the event log 112 to determine whether member events meet the definition of one or more predefined offenses 118. The offense module 116 includes a set of configurable triggers 119, each of which is defined to be activated in response to detection of an offense or combination of offenses. Activation of a trigger causes an audit module to perform an audit of the member associated with the offense as specified by the trigger. Additionally, the offense is logged in an offense log 121 comprising an indication of offenses on a per-member basis. As will be described in detail below, the audit module 120 performs an audit of the member in response and identified by a received trigger. Each audit includes the performance of one or more audit tests 122, which are defined as will be described below. Results of each audit are logged in an audit log 123 and also provided to a decision module 124, which determines, either automatically, manually (with input from a quality team 128 through an interface 130), or via a combination of both, what action, if any, should be taken.

As used herein, an "offense" is a discrete member activity-related event that has been deemed to have a negative impact on the overall panel quality either alone or in combination with other offenses. Quality at the survey level is improved by decreasing probability that offensive members show up in any one sample of members. In accordance with features of embodiments described herein, offenses may be defined with relatively little effort by a user of the system 100 via an interface 132 of the offense module 116. In one embodiment, the interface enables a user to specify a reason code, description, and severity (e.g., high, medium, or low) for an offense. Properties of an offense may include, but are not limited to, offense category, or type, and offense detail, or the rule(s) defining the offense. An offense relates to an instance of the offense by a member at a particular time and may be related to zero-to-many triggers, as will be described below.

Examples of offense categories, or types, may include, but are not limited to, client feedback loop selection, profile update, enrollment survey complete, internal survey complete, external survey complete, reward redemption, and earning reward points. Each of the internal, external, and enrollment survey complete types of offenses relate to undesirable response behaviors, such as inconsistent answer patterns, answering a red herring question in the affirmative, straight-lining, or incongruous/illogical combinations of answers. Client feedback loop selection types of offenses include whatever a client identifies as undesirable behavior, including the survey complete types of offenses previously described, as well as behaviors such as gibberish or profanity, failure of a basic knowledge test, or anything else a client may imagine now or in the future as undesirable. In one aspect, the embodiments described herein provide a systematic method by which to capture such data and factor it into various decision processes. Reward redemption types of offenses include situations in which multiple members attempt to redeem rewards using the same partner account.

As used herein, the term "straightlining" refers to a situation in which a member selects the same number/letter answer for each question on a survey or any other perceptively predictable pattern, e.g. A-B-C-D-A-B-C-D. The term "speeding" is used herein to designate a situation in which a member completes a survey too quickly. In the case of speeding, the offense detail will specify the minimum length of time acceptable for completion of each survey. Speeding is adverse to quality because a speeding panelist is likely not to answer survey questions in an honest, thoughtful manner. If a member commits a minor speeding offense, the offense may be combined with other minor offenses before an audit will be triggered.

A profile update offense may be committed by a member by the member's updating his or her profile to modify an indelible attribute (e.g., gender, ethnicity, birth date) or an occupation attribute more than a maximum number of times in a predefined time period (e.g., three times in a one month period). The offense detail will indicate which attributes are "indelible," as well as how many times in a specified time period is "too many" in the case of occupation attribute changes. A related offense occurs by a member providing an answer during a screening questionnaire for participation in a survey that is inconsistent with such attribute in the member's profile. Traps established in the screeners compare a member's profile answer to indelible attributes to the answer selected in the screeners. As used herein, "screeners" refers to targeting criteria questions that are sent as part of the normal course of business to determine which members in the member pool are desired by clients and which members are not. In most cases, the decision criteria are things like demographics or purchasing behaviors. Red herrings or other traps can be included in screeners as offenses tracked in the system.

An enrollment survey complete offense may be committed by a member by his or her indicating on the enrollment survey attributes that are highly improbable or that are inconsistent with another attribute. Such offenses should trigger an audit and ultimately expulsion if the offense is serious enough. Examples of such offenses include:
  age attribute=18 and occupation attribute=physician
  gender attribute=Male in combination with an indication
    of female health issues
  Ultra-frequent readers (e.g., 50 magazines per month)
  Ultra-frequent travelers (e.g., 25+business and leisure trips
    per year)
  Ultra-frequent car renter
  Excessive ailments An earning reward points type of offense relates to a sudden, significant increase in a member's reward point earnings from one time period to the next, which may indicate that the member performed a professional survey taker ("PST")-like profile enhancement or has exploited a loophole to either qualify for surveys or to receive multiple credits for a single survey. The offense detail for this offense would define what constitutes a "sudden" and "significant" increase, as well as the current and prior time period lengths.

With regard to reward redemption, a single person should be limited to a single account across the system. Specifically, there exist multiple, unique groups of members which may be tied together with common pieces of data, such as e-mail addresses, cookies, and digital fingerprinting. Every effort is made to ensure that each member is participating on only one panel. Rewards redemption may be an opportune time to capture undesirable behaviors, such as a member's attempting to get rewards, such as frequent flyer rewards, for example, via multiple system accounts. Violation of this rule can be detected via cookie clashes, IP clashes, IP geo-location discrepancies within a profile address, and multiple member accounts redeeming for the same partner account. Examples of external partner accounts and redemptions include frequent flier number for earning airline miles awards, a frequent stay number for earning frequent stay points, and a Borders Rewards number for earning Borders store credit toward future purchases. Some redemptions require external partner account identifiers in order to deposit rewards into the external account. Once a single external partner account is used for redemption by more than one member, an audit should be triggered before every member that uses that external partner account.

Occasionally, a member will hack a specific URL in order to call a task called COMPLETE.DO to receive full participation points without actually participating. This offense does not simply trigger an audit; it results in automatic expulsion of the offender from the panel without the need for further audit testing or review. This is a single example of when system considers offenses of this character, where there is clear and unquestionable intent to defraud. The invention contemplates others by providing the mechanism for an offense to lead directly to expulsion.

In one embodiment, questions with red herring answer choices are incorporated into member enrollment survey and profile update screens. For example, a member may be asked whether they or anyone in their household suffers from X, which is a fictitious disease. A member's selecting a fictitious answer choice within member enrollment screens, profile update screens, or internal surveys is defined as an offense and should usually automatically trigger an audit. Ideally, these triggers function in real-time, or at least daily, without the need for someone to run a manual query. Additional examples of red herring question/answers include using fake investment firm names for investable asset update, fake certifications for IT and other professionals, and fake customer loyalty programs. Offense rules will define red herring attribute values to be logged.

As previously noted, an audit of a member is triggered upon detection of an offense or combination of offenses committed by the member as defined in the offense module 116. Additionally, as will be described in greater detail below, in one aspect, audit of a member may be triggered randomly; that is, not in response to the occurrence of one or more offenses. An audit defines a set of one or more audit tests to be conducted in connection with a triggered member. Audits and audit tests can be defined by a user via an interface 134 of the audit module 120. One or more of the tests may be required to be performed in a particular order, while others may be performed simultaneously. Additionally, performance of one test may be triggered by the result of another test. Members currently under audit are defined to be in "quarantine" and may not be placed on new panels or receive new survey opportunities. A member's status as "quarantined" should be communicated to external operational systems so that such systems can exclude those members from new sales counts and segmentations. An audit test is a test that specifies a panelist event to measure for a given period of time. Specifically, an audit test gathers results for a particular metric, which may contain binary, numeric, or categorical information. An audit test may include identity verification using an external identity verification service, trap survey testing to test for answers that are inconsistent with the member's profile information, speeding and that may include red herrings, subject matter testing designed to test the member's status as an "expert" in a particular area, manual testing, and duplicate member testing (using, for example, IP address comparison, cookies, geolocation, and MAC addresses).

A trap survey is an internal, non-revenue-generating survey that contains numerous "traps" designed to distinguish undesirable members (e.g., dishonest persons, persons with ulterior motives for participating in the survey process) from desirable ones. In one embodiment, a number of trap surveys will be available from which to select and the specific one selected for an audited member to complete is based on key profile attributes and derived attributes for that member. For example, a member whose profile identifies her as a physician would be given a trap survey that includes some subject matter expert questions that any physician should be able to answer correctly. Results of survey questions that can be used to gauge veracity should be marked as audit test results to be reviewed by a "quality team" at the conclusion of the audit.

A manual test is a special type of audit test that must be performed outside the system 100 by a member of the quality team. For example, C-level executives for large companies can be verified via Internet searches or phone calls. An audited member review dashboard may be provided for consolidating all of the relevant data on an audited member. The quality team uses the dashboard to consider the member's case from a holistic standpoint. Data points on the dashboard may include:

Key member profile attributes and update history
Survey invitation, response, and completion history
Audit test results
Offense history
Past audit history
Final audit judgment (for completed audits)

Following the completion of an audit, the audited member will receive one of several possible judgments, including, but not limited to, permanent expulsion from the pool, temporary suspension from the pool, or immediate return to the pool. The quality team renders the judgment by considering the holistic view presented via the audited member review dashboard, discussed above. Expelled members are removed from the pool and will not receive subsequent invitations to rejoin the pool.

The audit includes a "veracity score" that is used to automate judgments in cases where what the judgment would be clearly predicted using a manual judgment approach. In other words, score thresholds at the extremes for black-and-white cases would be automated so that a manual audit can be avoided. For cases in which a judgment cannot be reliably predicted based on the veracity score alone, the quality team will perform manual judgment. The veracity score will indicate the actual judgment rendered as well as the date and time of the rendering.

One embodiment supports user configurability of rules and other information related to offenses and audits. This embodiment enables a user to alter how the system monitors member/ panelist behavior and under what circumstances panelists are flagged for audit without necessitating the involvement of a technology specialist to do so. The range of rules identified by a system administrator will determine the practical limit on robustness of the system's configurability. An administrative person or team is responsible for determining what rules to instantiate and for configuring the rules in the system 100.

In one embodiment, the offense module 116 includes a trigger maintenance interface that supports running a trigger in test mode before it goes into production to report the count of members it would place into audit. This allows configuration of the particular offense or set of offenses that define the trigger.

In addition to enabling configuration of audit surveys, the audit interface 134 enables configuration of trap surveys, and assignment of the trap survey to one or more member segments and configuration of member segment hierarchy for use in determining which trap survey to deliver, as well as whether or not to perform manual ID verification. Examples of member segments include physicians, C-level executives, IT decision-makers, and generic consumers.

As previously noted, offense categories and specific offenses are defined within the system. Each offense has rules defined to adjust the sensitivities of what is and is not logged. These rules are maintained via the interface 132. Offenses should be logged at least daily, but may be logged more frequently as required.

A trigger defines a single offense or a set of offenses committed by a single member that warrant an audit of the member. The trigger also identifies a specific type of audit, which specifies the audit process for the member. Additionally, audits may be triggered based on random selection. The random selection may be performed by a quality team and may occur outside the system; however, the system needs to accept those members and place them into the specified audit. The rationale behind the random audit selection is that all of the possible offenses that members could commit is not known. Auditing random members allows the system potentially to learn about negative behavior as time passes. It will be noted that it may be advisable to audit certain member segments more heavily for various reasons, including, for example, that the segment is over-represented or under-utilized, such that eliminating low quality members affords more opportunities (and hence rewards) to better members and results in a higher retention rate, or that clients require a very high level of sample quality for the segment (e.g., brain surgeons).

Like offense logging, real-time triggering is not required. Daily triggering is sufficient; however, more frequent triggering is acceptable if performance and project cost are not negatively impacted.

The standard audit will be the designated audit for the vast majority of trigger-detected members. While the trigger is meant to quickly detect a suspicious member event or action, the standard audit is intended to give the quality team a holistic, dashboard, snapshot view of the individual member, taking into consideration (1) key profile attributes and corresponding update history; (2) past survey invitation and response history and approximation of member-generated revenue; (3) past audit dates with trigger event and results; (4) client feedback loop history, if any; (5) external automated ID validation results; (6) manual ID validation for selected high value segments; (7) test results from audit "trap" surveys; and (8) duplicate account validation results. Each standard audit data element provides data points that should be easily accessible to the quality team to enable them to make an informed judgment on the audited member's future on the panel. Audit trap surveys are internal surveys that are used to provide a rigorous test of the member's quality. Each member placed into the standard audit should receive at least one trap survey.

In one embodiment, several trap surveys are used, each tailored toward a specific member segment. For high-value segments, subject matter expert questions within the surveys will provide and extra level of validation in addition to the standard tests for speeding, straight-lining, inconsistent answer sets (both within the survey and as compared with current profile attributes), and red herring traps.

Trap surveys should be delivered by the system or an associated system. The audit judgment requires the member's response to the survey in order to make an informed decision; thus, the system needs to monitor the delivery and response of the trap survey and send reminder e-mails periodically until either a response is received or the reminder limit is reached. Once the reminder limit is reached, the audit process will continue with an appropriate note that no trap survey response was received. Non responding members receive no other content other than the trap survey while until the point when they respond and pass the trap survey.

For the most commonly-used attributes in job segmentation, current attribute values, as well as attribute update history, should be loaded into each member's audit record in order to provide the quality team with a consolidated view of the profile. The attributes defined as "key" to be loaded in the audit should be adjustable with minimal or no input from a technology personnel. Profile attributes should include, at a minimum, basic demographic information (age, gender, ethnicity, income, education), occupation attributes, and business-to-business ("B2B")-derived attributes of a member. In particular, derived attributes are combinations of attributes. For example, someone who is an attorney (attribute 1) with a title of VP or higher (attribute 2) in a company having at least 100 employees (attribute 3) could be identified with a derived attribute of "corporate counsel." Clearly, this provides means by which to more efficiently organize data for segmentation.

The member's past survey and response history should provide the quality team with insight into the member's activity level and revenue-generating available by affording a look at the number of invitations, responses, completions, and terminations, as well as an indication of approximate revenue generated broken down into appropriate (e.g., one month) time periods. Additionally, since some offenses are logged without an audit necessarily having been triggered, a snapshot of all offenses that have been logged for the audited member provides another helpful set of data points to give the quality team insight. For members that have previously been audited, a summary section including past audit dates with trigger event should give the quality team clear insight into any recurring behavior that has triggered auditing.

All members receiving the standard audit also need to be given an external ID validation, for example, through an identification verification service. The member's name, address, date of birth, and potentially government-issued ID number would be electronically sent to a third party validation with a match code result being stored following validation. For high value B2B segments, an additional level of ID validation may be executed manually. When an audit is triggered for a high value B2B member, an alert may be sent to a designated quality team member to take action. The result of the manual ID validation is later input as an audit test result by the quality team member.

Each audited member should be checked on various technology data points (e.g., cookies, IP addresses, MAC addresses, etc.) for duplicate accounts. Since this type of validation is not a simple yes or no, each data point should be logged and any duplications detected should be indicated. The quality team will take these potential duplication inputs into account when rendering a final audit judgment. For some triggers, the seriousness of the offense is great and clear enough to warrant immediate expulsion without requiring an audit.

Referring now to FIGS. 2-8, illustrated therein are graphical user interface screen displays for enabling a user to interact with the system of FIG. 1 in accordance with one embodiment. It will be recognized that the screen displays illustrated in FIGS. 2-8 are illustrative of the types of screens that may be presented to the user and are not all inclusive. In particular, more or fewer than all of the screens illustrated in FIGS. 2-8 may be used; moreover, the information presented via the screens may be more or less comprehensive than that illustrated in the Figs.

Figure 3:
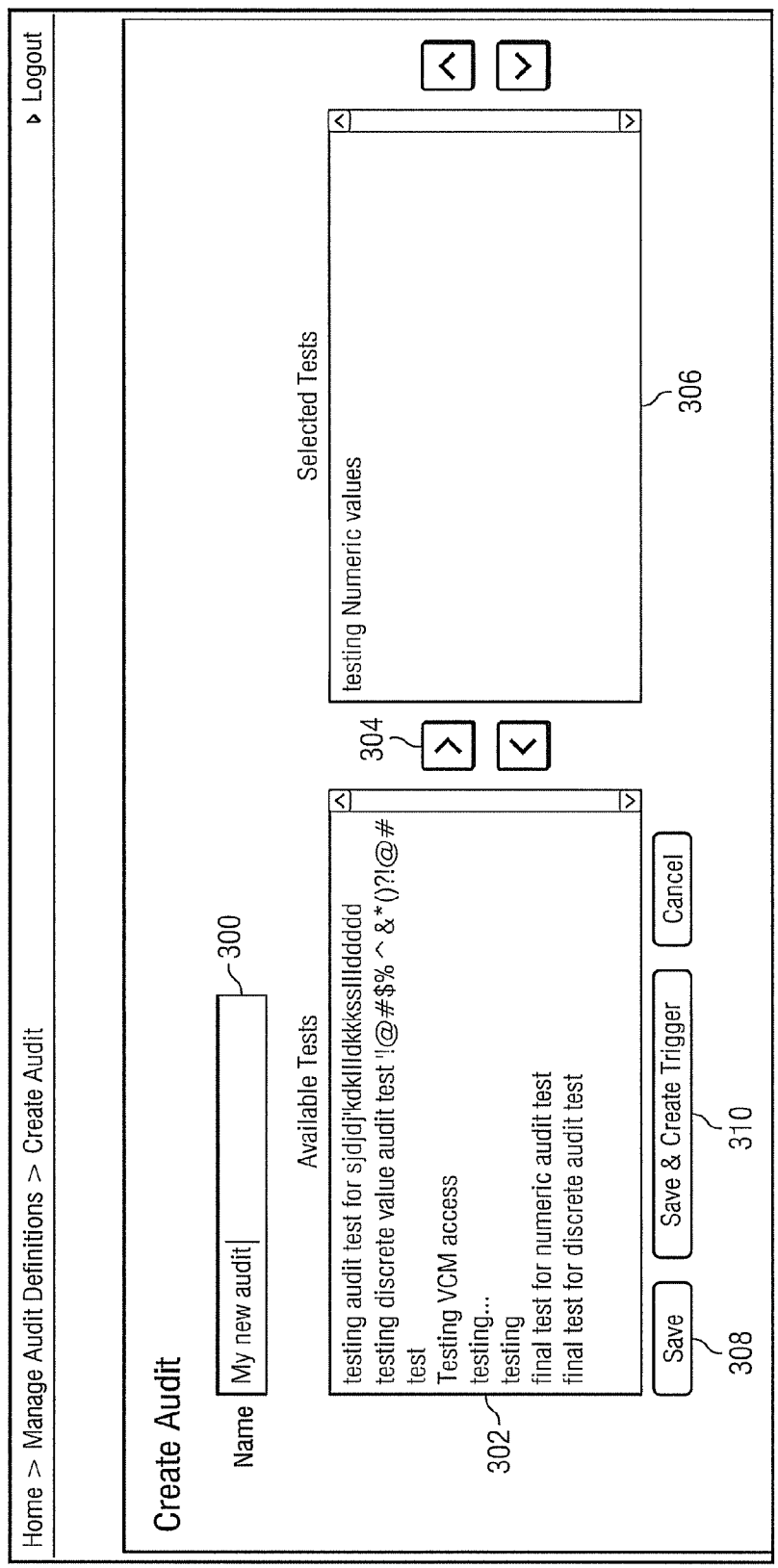
Figure 5:
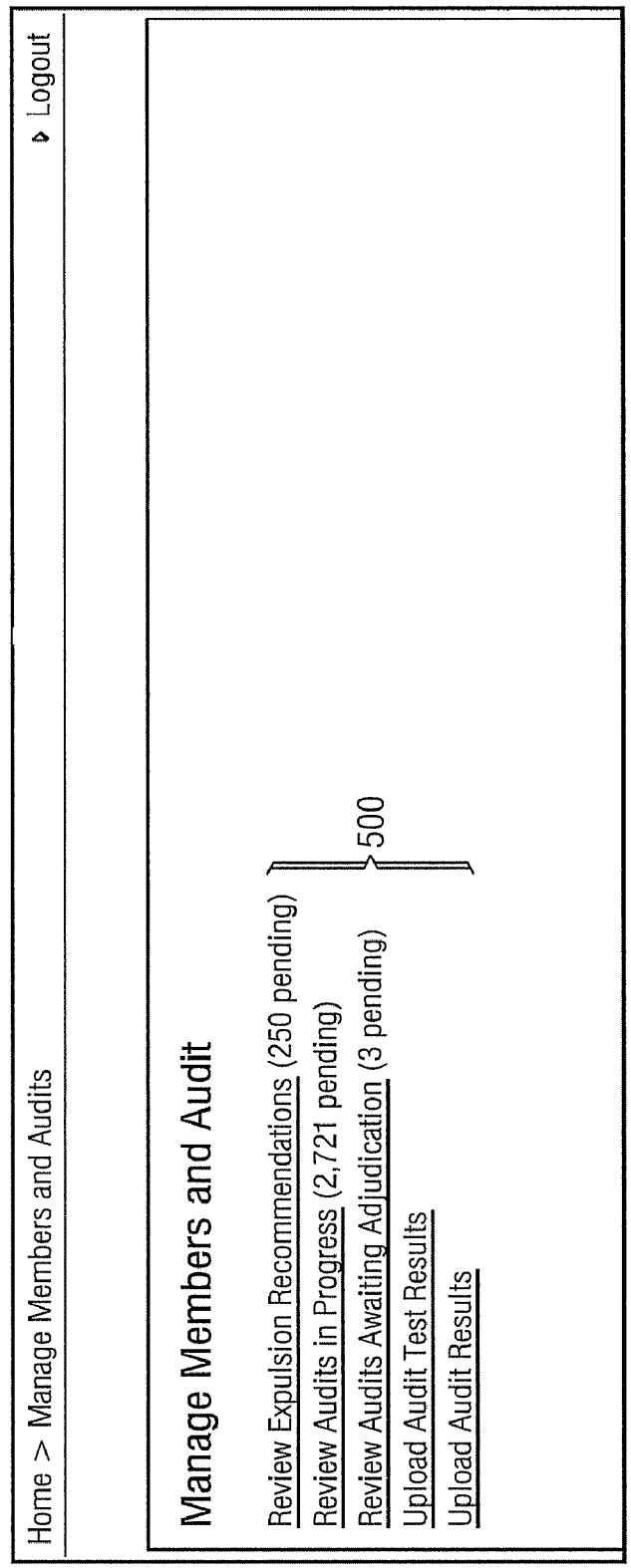

FIGS. 2 and 3 illustrate graphical user interface ("GUI") screens for enabling a user to create a new audit test (FIG. 2) and a new audit (FIG. 3) via the interface 134 (FIG. 1). In particular, as illustrated in FIG. 2, a user indicates a name of the new audit test in a name field 200, then selects whether the results of the test are to be numeric values 202 or discrete values 204. If the results are to be discrete values 204, such values are indicated in a field 206 and then an add button 208 is selected to add the value to a list of values 210. Clicking a save button 212 results in the new test being saved. Referring to FIG. 3, a user indicates a name of a new audit in a field 300 and then selects one or more entries from a list of available tests 302, clicking on an arrow button 304 to add each selected test to a list of selected tests 306. Once completed, the audit can be saved by clicking on a button 308 or saved and a trigger created therefor by clicking on a button 310.

FIG. 4 illustrates creation of a trigger rule via the interface 132 (FIG. 1). The user enters a description of the trigger in a field 400 and associated comments in a field 402. The user then selects an action from a drop down list 404 as well as a frequency with which the trigger should be performed via a drop down list 406. The rule for activating the trigger is indicated in a field 408. Subsequently clicking a validate button 410 results in validation of the trigger, meaning that the code is a workable SQL code; clicking a test button 412 tests the trigger by processing the trigger and returning a set of members who can be examined; and clicking a save button 414 saves the trigger.

FIGS. 5-8 illustrate screens for managing members and audits via the interface 130. In particular, a screen shown in FIG. 5 enables a user to select one of several actions, collectively designated by a reference numeral 500, with regard to review and management of audits. A screen shown in FIG. 6 enables a user to select one or more members, collectively designated by a reference numeral 600, on which to take action (e.g., return to pool or expel from pool). A screen shown in FIG. 7 enables a user to display a list of members currently undergoing audits 700, which list filtered using various selectable filters 702, 704, 706, 708. A screen shown in FIG. 8 enables a user to display a list of members awaiting audit adjudication 800, which list filtered using various selectable filters 802, 804, 806, 808, and then to review and edit the audit results for, as well as to take action with respect to, a member selected from the list 800 by selecting an action from a drop down list 810 and then clicking on an execute button 812.

As previously noted, the audit interface 130 consolidates all of the data elements described in the standard audit process described above. An audit judgment is made using this interface. The interface includes two primary screens, including an audited member list and an individual member audit decision dashboard. The first screen displays a list of members currently under audit and includes summarized audit information for each. The individual dashboard includes all data elements from the audit, as consistent with the audit process. A manual test messaging component and manual test dashboard are also provided. A person designated by the quality team performs manual tests for each manual test type. This component should alert (e.g., via e-mail) that a manual test is needed. The designated person views the manual tests requiring his/her attention via the manual test dashboard, which should provide the basic member profile information necessary to enable the designated person to perform the test. Once the test is performed, the result is entered via the dashboard interface. One situation in which a manual test would be useful would be manual ID valuation for high value segments, such as top-level executives or physicians. The designated person would use the member's profile information to perform the test by performing a manual search to verify the validity of such information relative to the member.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Moreover, various ones of the elements illustrated in FIG. 1 may be implemented using specially programmed hardware or general purpose computers in combination with computer-readable media on which is stored instructions executable by such computers to accomplish the requisite functions. Still further, user interfaces may be incorporated into or provided in connection with each of the various modules and elements, whether or not explicitly illustrated, for enabling user configuration of the rules and procedures applied and implemented thereby. Therefore, the claims should be interpreted in a broad manner, consistent with the present disclosure.

What is claimed is:

1. A system for optimizing composition of a pool from which members are selected to serve on market research panels, the system comprising:

one or more computers having computer-readable storage media to which a database is stored, said database comprising a plurality of member profiles and survey data associated with the members;

a datamart for periodically scanning the database to discover events and subsequently logging details of each of the discovered events in an event log, wherein the events relate to member activity in connection with survey participation and wherein details of each of the discovered events comprise an identity of the member associated with the event;

an offense module for periodically evaluating the event log to determine whether one of the discovered events comprises an offense committed by one of the members and logging the offense in an offense log, wherein the offense is an event that has been deemed to have a negative impact on overall panel quality either alone or in combination with another offense;

an audit module for performing an audit of the one of the members and logging results of the audit in an audit log, wherein the audit determines a fitness of the audited member to continue to serve on market research panels; and wherein said members receive rewards for their participation in surveys, and wherein said audit results contains information pertaining to whether the offense is indicative of the audited member behaving in a manner that has a negative impact on overall panel quality in an effort to receive rewards.

2. The system of claim 1 further comprising a decision module for evaluating the audit results and determining a course of action with respect to the one of the members based on the evaluation.

3. The system of claim 2 wherein the recommended course of action is selected from a group consisting of permanent expulsion from the pool, temporary suspension from the pool, and immediate return to the pool.

4. The system of claim 1 further comprising:
an audit trigger module comprising an audit trigger associated with one or more offenses and wherein the trigger defines a corresponding audit to be performed by the audit module in response to the one or more offenses being detected in the offense log by the audit trigger module.

5. The system of claim 4 wherein the performing an audit comprises performing at least one audit test defined by the trigger.

6. The system of claim 5 wherein the at least one audit test comprises a test selected from a group of test consisting of identity verification tests, trap survey tests, subject matter tests, manual tests, and duplicate identity tests.

7. The system of claim 1 wherein the offense is of an offense type selected from a group consisting of a client feedback loop selection offense, profile update, an enrollment survey complete offense, an internal survey complete offense, an external survey complete offense, a reward redemption offense, and an earning reward points offense.

8. A system for optimizing composition of a pool from which members are selected to serve on market research panels, the system comprising:
means for storing a plurality of member profiles and survey data associated with the members;
means for periodically scanning the database to discover events and subsequently logging details of each of the discovered events in an event log, wherein the events relate to member activity in connection with survey participation and wherein details of each of the discovered events comprise an identity of the member associated with the event;
means for periodically evaluating the event log to determine whether one of the discovered events comprises an offense committed by one of the members and logging the offense in an offense log, wherein the offense is an event that has been deemed to have a negative impact on overall panel quality either alone or in combination with another offense.

9. The system of claim 8 further comprising means for evaluating the audit results and determining a course of action with respect to the one of the members based on the evaluation.

10. The system of claim 9 wherein the recommended course of action is selected from a group consisting of permanent expulsion from the pool, temporary suspension from the pool, and immediate return to the pool.

11. The system of claim 8 further comprising:
means for periodically evaluating the offense log, the offense log evaluating means comprising an audit trigger that defines a corresponding audit to be performed by the means for performing an audit in response to one or more offenses being detected in the offense log by the offense log evaluating means.

12. The system of claim 11 wherein the performing an audit comprises performing at least one audit test defined by the audit.

13. The system of claim 12 wherein the at least one audit test comprises a test selected from a group of tests consisting of identity verification tests, trap survey tests, subject matter tests, manual tests, and duplicate identity tests.

14. The system of claim 8 wherein the offense is of an offense type selected from a group consisting of a client feedback loop selection offense, profile update, and enrollment survey complete offense, an internal survey complete offense, an external survey complete offense, a reward redemption offense, and an earning reward points offense.

15. A method for optimizing composition of a pool from which members are selected to serve on market research panels, the method comprising:
storing a plurality of member profiles and survey data associated with the members in a database;
periodically scanning the database to discover events and subsequently logging details of each of the discovered events in an event log, wherein the events relate to member activity in connection with survey participation and wherein details of each of the discovered events comprise an identity of the member associated with the event;
periodically evaluating the event log to determine whether one of the discovered events comprises an offense committed by one of the members and logging the offense in an offense log, wherein the offense is an event that has been deemed to have a negative impact on overall panel quality either alone or in combination with another offense;
performing, by one or more computers, an audit of the one of the members and logging results of the audit in an audit log;
determining, by the one or more computers, based at least in part on the results of the audit, a fitness of the audited member to continue to serve on market research panels; and
rewarding said members for their participation in surveys; and
wherein said determining said fitness of the audited member to continue to serve on market research panels audit comprises determining whether the offense is indicative of the audited member behaving in a manner that has a negative impact on overall panel quality in an effort to receive rewards.

16. The method of claim 15 wherein the determining comprises evaluating the audit results and determining a course of action with respect to the one of the members based on the evaluation.

17. The method of claim 16 wherein the determined course of action is selected from a group consisting of permanent expulsion from the pool, temporary suspension from the pool, and immediate return to the pool.

18. The method of claim 15 wherein the offense has a trigger associated therewith, the trigger defining a corresponding audit of the one of the members and wherein the performing an audit comprises performing at least one audit test defined by the corresponding audit.

19. The method of claim 18 wherein the at least one audit test comprises a test selected from a group of tests consisting of identity verification tests, trap survey tests, subject matter tests, manual tests, and duplicate identity tests.

20. The method of claim 15 wherein the offense is of an offense type selected from a group consisting of a client feedback loop selection offense, profile update, an enrollment survey complete offense, an internal survey complete offense, an external survey complete offense, a reward redemption offense, and an earning reward points offense.

21. The system of claim 1 wherein said datamart, said offense module, and said audit module further comprise instructions stored to computer-readable media that when executable by one or more computers cause the computers to perform said periodically scanning the database to discover events and subsequently logging details of each of the discovered events in the event log, said periodically evaluating the event log to determine whether one of the discovered events comprises an offense committed by one of the members and logging the offense in the offense log, and said performing an audit of the one of the members and logging results of the audit in the audit log.

22. The system of claim 1 wherein the audit results contains information pertaining to whether the offense is indicative of the audited member providing false profile information in an effort to qualify for participation in certain market research panels for which the audited member would otherwise not qualify.

23. The system of claim 1 wherein the audit results contains information pertaining to whether the offense is indicative of the audited member either a) intentionally answering survey questions inaccurately or b) failing to devote sufficient time and/or attention to answering survey questions accurately.

24. The system of claim 1 further comprising:
an audit trigger module for determining, from the offense log, whether to trigger an audit of the one of the members by said audit module.

25. The system of claim 24 wherein the audit trigger module determines whether to trigger the audit based on one or more of timing, frequency, and combination of offenses in the offense log.

26. The system of claim 24 wherein the audit trigger module determines, based at least on part on one or more offenses in the offense log, to expel the one of the members from the pool without first triggering an audit of the one of the members.

27. The method of claim 15 wherein said database is stored to a computer-readable media.

28. The method of claim 15 wherein said storing comprises:
storing to one or more computers having computer-readable medium to which said database is stored.

29. The method of claim 28 further comprising:
performing said periodically scanning the database to discover events and subsequently logging details of each of the discovered events in the event log by datamart logic;
performing said periodically evaluating the event log to determine whether one of the discovered events comprises an offense committed by one of the members and logging the offense in the offense log by an offense module; and
performing said audit of the one of the members and logging results of the audit in the audit log by an audit module.

30. The method of claim 29 wherein said datamart logic, said offense module, and said audit module comprise instructions stored to computer-readable media that when executable by one or more computers cause the computers to perform the respective operations.

31. The method of claim 15 wherein the audit results contains information pertaining to whether the offense is indicative of the audited member providing false profile information in an effort to qualify for participation in certain market research panels for which the audited member would otherwise not qualify.

32. The method of claim 15 wherein the audit results contains information pertaining to whether the offense is indicative of the audited member either a) intentionally answering survey questions inaccurately or b) failing to devote sufficient time and/or attention to answering survey questions accurately.

* * * * *